(12) United States Patent
Niehoff et al.

(10) Patent No.: US 8,024,832 B1
(45) Date of Patent: Sep. 27, 2011

(54) AQUARIUM CLEANING DEVICE WITH DEBRIS COLLECTING NET

(76) Inventors: John R. Niehoff, Farmingville, NY (US); Jennifer Coppola, Farmingville, NY (US)

( * ) Notice: Subject to any disclaimer, the term of this patent is extended or adjusted under 35 U.S.C. 154(b) by 634 days.

(21) Appl. No.: 12/200,828

(22) Filed: Aug. 28, 2008

(51) Int. Cl.
*A47L 1/06* (2006.01)
*A01K 63/00* (2006.01)

(52) U.S. Cl. .............. 15/1.7; 15/105; 15/118; 15/220.1; 4/490; 119/264; 210/470

(58) Field of Classification Search .............. 15/1.7, 15/105, 104.8, 118, 210.1, 220.1, 221, 229.11, 15/244.1; 4/490, 496; 119/264; 210/167.21, 210/238, 407, 408, 470
See application file for complete search history.

(56) References Cited

U.S. PATENT DOCUMENTS

| 4,176,419 | A | 12/1979 | MacDonald |
| 4,198,720 | A * | 4/1980 | Matsumoto .................... 15/1.7 |
| 4,392,570 | A | 7/1983 | Willinger |
| 4,571,766 | A | 2/1986 | Goldman et al. |
| 5,601,322 | A | 2/1997 | Forest |
| 7,036,263 | B2 | 5/2006 | Yang et al. |

\* cited by examiner

*Primary Examiner* — Mark Spisich
(74) *Attorney, Agent, or Firm* — Island Patent; F. Scott Tierno (57) ABSTRACT

An aquarium cleaning device structured for use with glass or plastic aquarium walls, enabling a dislodging and freeing of debris from the walls, while also simultaneously enabling a collecting of dislodged and freed debris for subsequent removal. The cleaning device includes a frame providable of a rigid, possibly closed, and flattened loop, and a netting material, each of which are preferably sandwiched between two scrubbing pads. An elongated handle portion is fixable to the rigid loop and scrubbing pads, and arranged for secure grasping by a user such that aquarium wall cleaning activities may be conducted. This abstract is provided to comply with rules requiring an abstract, and is submitted with the intention that it will not be used to interpret or limit the scope and meaning of the claims.

20 Claims, 6 Drawing Sheets

AQUARIUM CLEANING DEVICE WITH DEBRIS COLLECTING NET

TECHNICAL FIELD

The presently disclosed invention relates most generally to aquatic cleaning aids and devices. More particularly, the present invention relates to an improved aquarium cleaning device, structured for dislodging and freeing debris (e.g., algae) from walls and other locations inside an aquarium and simultaneously collecting dislodged and freed debris within a netting material of the cleaning device. The freed and collected debris may then be readily lifted and removed from the aquarium. Importantly, the most preferred embodiments of the invention are each usable with aquarium walls constructed of a variety of materials, including mineral, glass, acrylic, etc.

BACKGROUND

As understood by any individual who has in the past, or is currently maintaining an aquarium, one major activity that is required to keep the walls of the aquarium in pristine condition is the cleaning of the wall surfaces for clear vibrant viewing. This includes cleaning the outside surfaces, which is generally not too much of an issue, and further cleaning of the interior (water contacting) surfaces. The surfaces, which are also termed 'walls' of the aquarium, are typically made of glass or mineral materials (relatively hard substances), or alternately one or more available plastic materials (which are relatively soft materials).

As such, scrubbing pad materials must be selected carefully. To clean wall surfaces made of glass, scrubbing pads of a fairly high abrasiveness may be desirable for their cleaning prowess. However, using such a material on a softer material, such as plastic, can be disastrous. The problem can be complicated if a location has several aquarium tank types, with some of harder wall materials and some of softer wall materials. Care must be used to select the correct cleaning device using a scrubbing pad of the correct abrasiveness.

Another issue with commonly available and currently known cleaning devices is that they clean the wall surfaces, but leave the freed and dislodged materials floating freely in the interior of the tank—adding a cleaning load to the filter/aeration system. For those that are inclined to do so, some kind of manual strainer may be employed, after the wall scrubbing activities have been completed. This improves the outcome of the wall cleaning, but still enables materials to be dispersed within the aquarium tank, which must be eventually filtered, or removed with a change of tank water.

Accordingly, as appreciated by skilled persons there is a need for an improved aquarium cleaning device, that enables inner wall surfaces to be safely scrubbed, causing a dislodging and freeing of debris from wall locations of the aquarium, while simultaneously supporting a collecting of the dislodged and freed debris upon an included netting material for subsequent removal from the aquarium. A number of other characteristics, advantages, and or associated novel features of the present invention, will become clear from the description and figures provided herein. Attention is called to the fact, however, that the drawings are illustrative only. In particular, the embodiments included and described, have been chosen in order to best explain the principles, features, and characteristics of the invention, and its practical application, to thereby enable skilled persons to best utilize the invention and a wide variety of embodiments providable that are based on these principles, features, and characteristics. Accordingly, all equivalent variations possible are contemplated as being part of the invention, limited only by the scope of the appended claims.

SUMMARY OF PREFERRED EMBODIMENTS

In accordance with the present invention, an aquarium cleaning device useful for dislodging and freeing debris from locations within the aquarium, including the vertical walls of the aquarium, further provides for the simultaneous collecting of dislodged and freed debris for subsequent removal from the aquarium. The cleaning device includes a rigid frame structure preferably having a substantially rigid, closed, and flattened loop, with the loop having what may be termed a first side (S1) and a second side (S2). Specifically, the first side may be assumed to be located on a first side of a plane passing through, or defined by, the rigid loop. Similarly, the second side of the loop may be assumed to be located on the second side of the plane.

Further included is a netting material of a pre-selected area, having perimeter portions. The area of the netting material is selected to be of sufficient size (area) to cover an inner area established or defined by the loop of the frame structure. It may be noted that the area of netting material may be selected to be somewhat taut, or alternately may be provided to be baggy or pouch-like. Clearly baggy or pouch-like arrangements will enable the debris to be more easily collected and maintained in the netting material for subsequent lifting out of the aquarium for disposal.

The aquarium cleaning device further includes at least one scrubbing pad having a center opening (hole). The center opening, as with the frame and loop shape, may be any one or more of rectangular (illustrated), annular, U-shaped, etc. Importantly, a most preferable embodiment of the invention includes two scrubbing pads, with one included scrubbing pad securely fixable to the first side of the loop, while the second scrubbing pad is fixed to the second side of the loop. Accordingly, when two scrubbing pads are included, with one fixedly coupled (e.g., glued or secured) on the first side of the loop and a second scrubbing pad fixedly coupled to the second side, a sandwich arrangement results wherein the loop and perimeter portions of the netting material are sandwiched between the two scrubbing pads.

As will be discussed in significant detail hereinafter, the scrubbing pads are most preferably provided by a debris dislodging abrasive material or composition, which will not scratch the wall surfaces during cleaning activities. In a possibly most preferred embodiment, two scrubbing pads are provided, with each having differing levels of abrasiveness. In particular, it is contemplated that a most preferred embodiment of the aquarium cleaning device would have a first scrubbing pad provided by a first abrasive material with a level of abrasiveness intended for use with aquarium walls made of plastic, acrylic, another equivalently soft substance. The second scrubbing pad would be provided by second abrasive material with a level of abrasiveness intended for use glass, mineral, or another equivalently hard substances.

As understood by skilled persons, in order to assist an individual with scraping and cleaning activities, while keeping ones hand and forearm out of the aquarium water, an elongated handle portion may be included. The handle portion may be fixedly coupled to the loop of the frame structure and arranged to be graspable by a user such that the cleaning device may be employed for dislodging and freeing debris from locations within the aquarium, while also simultaneously collecting dislodged and freed debris for subsequent removal from the aquarium.

BRIEF DESCRIPTION OF THE DRAWINGS

In the drawings, like elements are assigned like reference numerals. The drawings are not necessarily to scale, with the emphasis instead placed upon the principles and features of the present invention. Additionally, each of the embodiments depicted are but one of a number of possible arrangements utilizing the fundamental concepts of the present invention. The drawings are briefly described as follows.

| Partial List Of Reference Numerals | |
| --- | --- |
| 10 | aquarium cleaning device |
| 12 | cleaning and collecting portion |
| 14 | abrasive material |
| 14-1 | first scrubbing pad |
| 14-2 | second scrubbing pad |
| 16 | handle (tube) receptacle |
| 18 | rigid loop |
| 20 | handle portion |
| 20a | first end (of 20) |
| 20b | grasping portion (of 20) |
| 24 | netting material |
| 26 | net pouch (of 24) |
| 30 | center opening |
| 32 | collection interior (of net pouch) |
| 40 | bond material (s) |
| 40a | hook-tape |
| 40b | loop-tape |
| 50a | first aquarium wall |
| 50b | second aquarium wall |
| E1 | extension (distance) |
| T1 | thickness (typical) |
| S1 | first side |
| S2 | second side |

DETAILED DESCRIPTION OF EMBODIMENTS OF THE INVENTION

It is important to establish the definitions of a number of descriptive terms and expressions that will be used throughout this disclosure. The term 'aquarium' is to be defined broadly as any structure having clear/transparent walls, which will be employed to contain one or more living things (e.g., plants, fish, frogs, turtles, etc.) within a controlled environment. Clearly, common and possibly expensive fish aquariums are certainly to be included. The expression 'center opening' as employed when discussing and describing scrubbing pads of the invention, may be assumed to indicate that one or more openings or omissions of abrasive material are provided when the abrasive pad is formed, or modified after fabrication. A most preferable scrubbing pad may be provided with a rectangular shape, and having a rectangular opening in the center of the scrubbing pad. The expression 'levels of abrasiveness', and more to the point 'differing levels of abrasiveness', will be used to distinguish the abrasiveness of a first scrubbing pad (say employable to clean plastic aquarium walls) from a second scrubbing pad (say employable to clean glass aquarium walls). The terms 'coupled', 'fixedly coupled', and or 'coupleable', and equivalents, are to be understood to mean that two or more described items are either directly connected together, or alternately, connected to each other via one or more additional, possibly implied or inherent structures or components. For example, when considering the coupling together of a rigid loop and a first end of a handle portion, each may be simply formed together, or welded together, or alternately include a female sleeve portion for use as a removable coupling into which an end of a graspable handle may be inserted. Other important terms and definitions will be provided, as they are needed, to properly define the present invention and its associated novel characteristics and features. In addition, the terms and expressions employed herein have been selected in an attempt to provide a full and complete description of the invention. These terms may very well have equivalents known to skilled individuals, which may be long established in the art. As such, the terminology employed has been carefully chosen and is intended for illustration and completeness of description, and may very well have equivalents that are known in the art, but not employed here.

Figure 1:
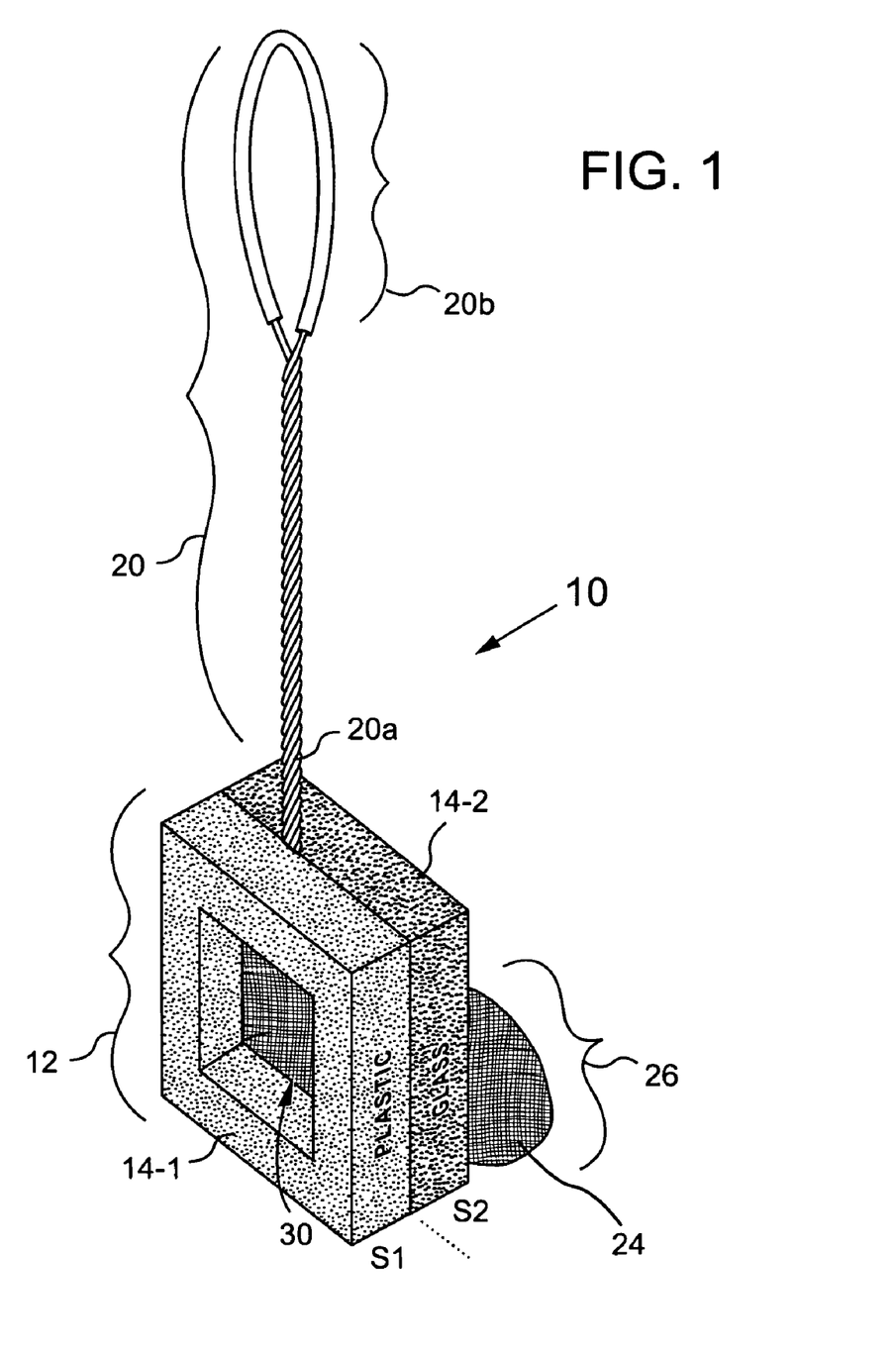
FIG. 1 provides an elevated perspective view of a first embodiment of an aquarium cleaning device having an integral debris catching netting material in accordance with the present invention.

Referring now to the drawings, FIG. 1 provides an elevated perspective view of a first possible embodiment of an aquarium cleaning device 10 of the invention. As depicted, the aquarium cleaning device 10 may be structured with a cleaning and collecting portion 12 and a handle portion 20. The cleaning and collecting portion 12 is arranged with a first cleaning or scrubbing pad 14-1, and preferably also includes a second cleaning or scrubbing pad 14-2.

As the aquarium cleaning devices 10 of the present invention are structured to be useful for dislodging and freeing debris from locations within the aquarium, the inclusion of a means to collect freed debris is provided for. Specifically, a mechanical filtering means, such as fine netting material 24 is included. Most preferably the netting material 24 is provided so as to form a net pouch 26. Therefore, the most preferred embodiments of the invention readily enable an individual to clean locations such as the inner walls of an aquarium, while also simultaneously collecting dislodged and freed debris, using the netting material and a possible net pouch 26, for subsequent removal from the aquarium. Each of these structures will now be discussed in greater detail.

Figure 2:
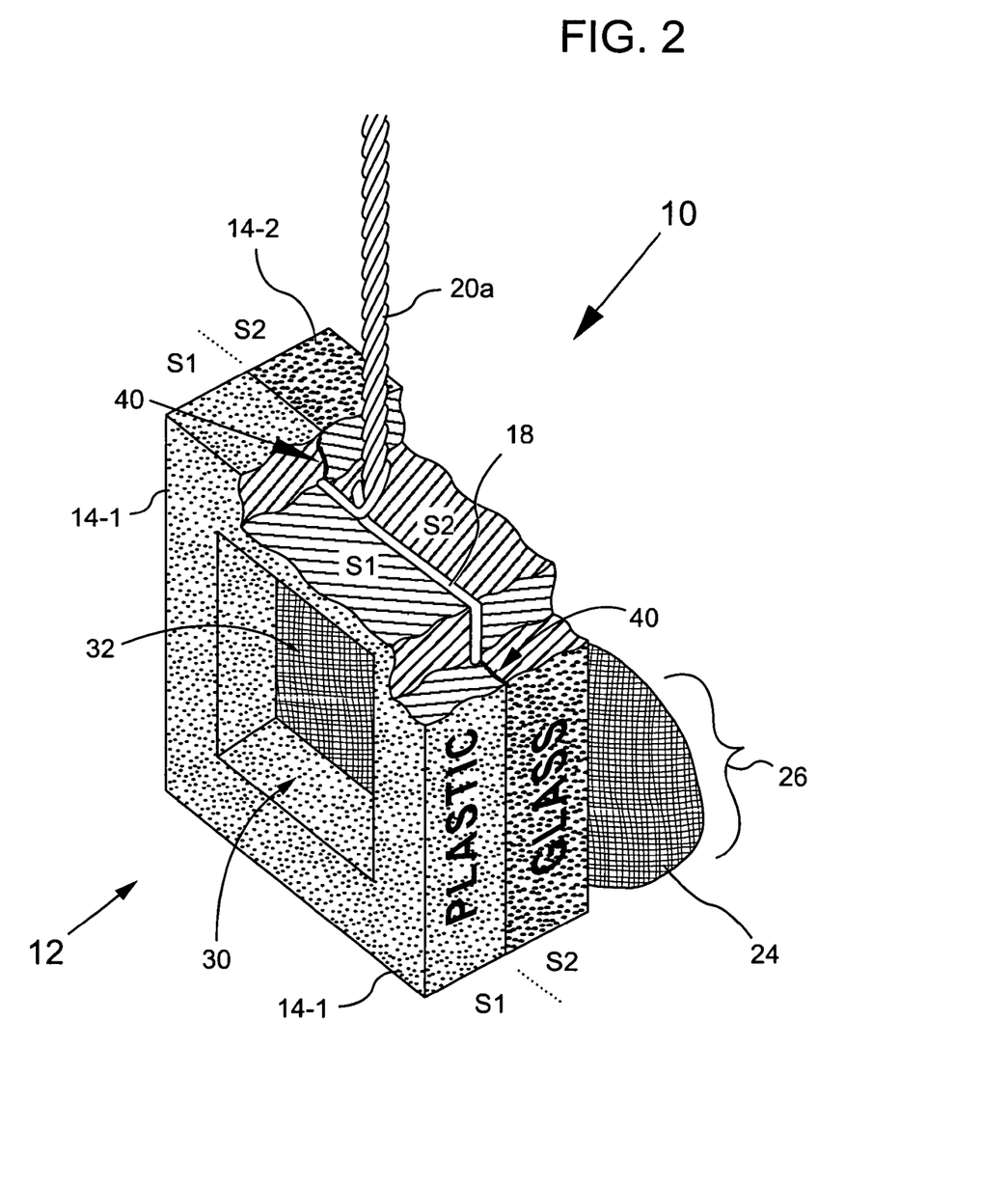
FIG. 2 provides an enlarged partial cutaway view, which is consistent with the embodiment depicted in FIG. 1.
Figure 3:
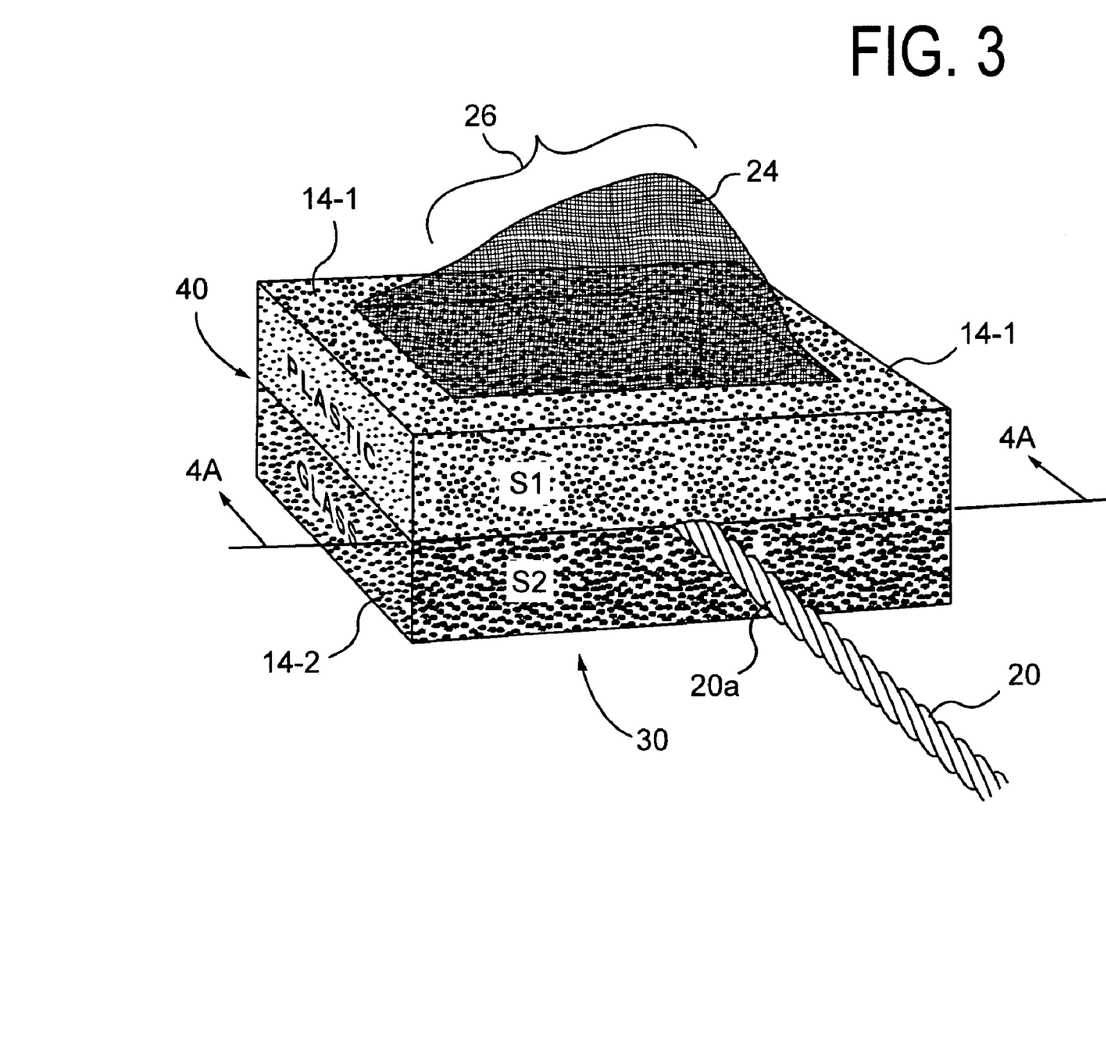
FIG. 3 is another perspective view consistent with the embodiments of FIGS. 1 and 2.

As can be best seen in FIG. 2, the cleaning and collecting portion 12 of preferred embodiments may include a frame structure. A most preferred and low cost frame structure may best be provided including a substantially rigid, closed, and flattened loop 18. The loop 18, which is depicted being exposed by a partial cutaway of a portion of the first scrubbing pad 14-1, may be formed of any of a variety of materials. For example, a simple and low cost embodiment of the loop 18 may be best provided as a preferably closed loop, formed of a rigid wire-material. As shown in FIGS. 1-3, the most preferred embodiments may be provided having the user graspable handle 20, which may be fixedly coupled at a first end 20a to the loop 18, or an equivalent/intermediate structure (such as a portion of the cleaning and collecting portion 12).

The inclusion of the loop 18 supports the use of scrubbing pads 14-1 and possibly 14-2, wherein the included pads are provided having an open center region. For example as depicted in FIGS. 1, 2, and 3, the aquarium cleaning device 10 includes a center opening 30, depicted as rectangular. However, it may be noted that although illustrated as being rectangular, other preferred center openings 30 may be round, a closed U-shape, or possibly triangular.

Returning to FIG. 1, and as also shown in FIGS. 2 and 3, the included netting material 24 may be provided having a sufficient area to be either taut, baggy, or most preferably pouch-like (as shown). The netting material 24 provides an integral debris catching means in accordance with the present invention. As such, this debris catching means may be utilized after a scraping and dislodging of debris, for collecting the debris. That is, the aquarium cleaning device 10 is specifically arranged for cleaning locations such as the inner walls of the aquarium by scraping and dislodging debris, while also being structured (with the netting material 24) for being able to somewhat simultaneously collect the dislodged and freed debris for removal from the aquarium.

As can be further seen in FIG. 2, a preferred sandwich arrangement includes a first scrubbing pad 14-1 fixedly coupled on or to the first side S1 of the loop 18, while a second scrubbing pad 14-2 is fixedly coupled to the second side S2. Thereby establishing the sandwich arrangement wherein the loop 18 is sandwiched between two inner surfaces of the two scrubbing pads 14-1 and 14-2.

It is important to further note that most preferred embodiments of the aquarium cleaning device 10, which will include this sandwich arrangement, may additionally provide for the use of two scrubbing pads that are selected to have differing levels of abrasiveness. Specifically, preferred embodiments may include a first scrubbing pad 14-1 having or formed of a first abrasive material with a first level of abrasiveness intended for use with, for example, plastic aquarium walls. The second scrubbing pad 14-2 may preferably be provided by second abrasive material having a second (higher) level of abrasiveness intended for use with harder glass aquarium walls (and equivalents). Further, as clearly shown in FIGS. 1 through 3, the respective scrubbing pads 14-1 and 14-2 may be labeled as "Plastic" and "Glass", respectively. Such labeling will be very helpful to aid in using the correct pad and level of abrasiveness on the correct wall material.

Briefly returning to the partial cut-away view of FIG. 2, it may be noted that perimeter portions of the netting material 24 (not explicitly shown) may be fixedly attached to at least one of the rigid loop 18 (not explicitly illustrated), and or to surfaces of included scrubbing pads, such as 14-1 and 14-2, possibly proximate to the center opening 30. For example, the perimeter portions of the netting material 24 may simply be glued to the interior edges of one or both scrubbing pads 14-1 and 14-2. Alternately, a maintaining of the sandwich arrangement may be realized, while also securing the perimeter netting portions, by any possible method, including using a bonding agent 40, such as glue and or double sided tape (depicted in FIG. 4A). As understood by skilled persons, the glue or double sided tape would be most preferably provided using waterproof materials.

Figure 4A:
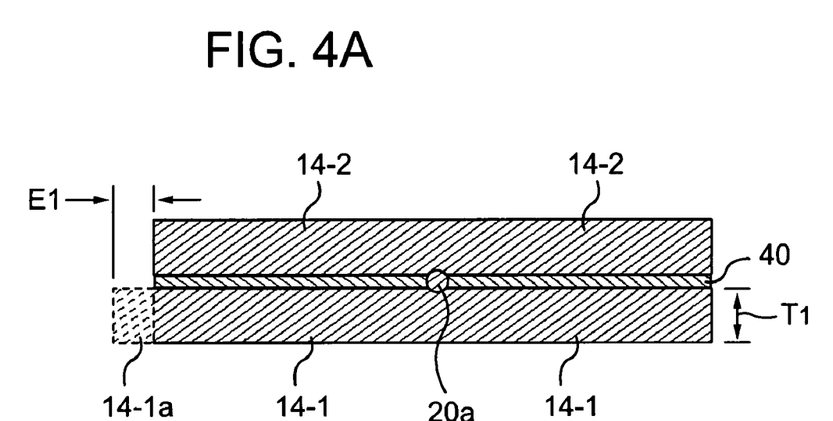
FIG. 4A depicts a cross-sectional view of a first possible arrangement of abrasive scrubbing pads, which may be employed with embodiments of the present invention, shown taken along the line 4A-4A of FIG. 3.
Figure 4B:
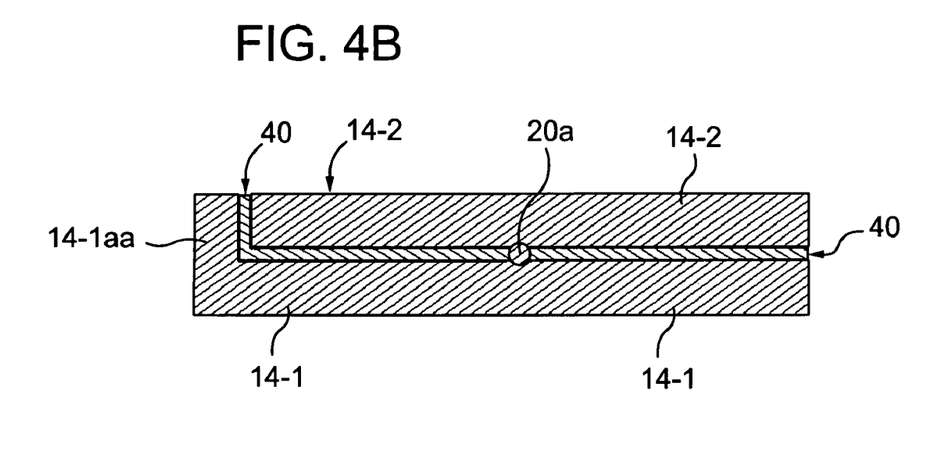
FIG. 4B depicts a cross-sectional view of another possible arrangement of abrasive scrubbing pads employable with embodiments of the present invention.
Figure 4C:
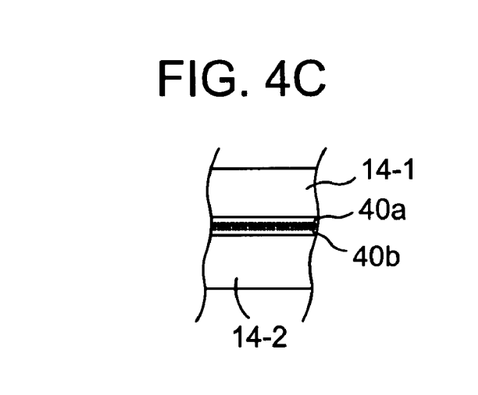
FIG. 4C depicts a partial cross-sectional view of an embodiment of scrubbing pads employing hook and loop tape as a bonding material.

Alternately, if it is desired to be able to remove and or replace the scrubbing pads, ubiquitous hook and loop tape, as illustrated in FIG. 4C may be employed. As shown the hook-tape portion 40a may be fixed to a first scrubbing pad 14-1, while the loop-tape portion is fixed to a second scrubbing pad 14-2. Accordingly, when considering the embodiment of FIG. 4C, a glue or sticky means, or a stitching approach may be used to hold each of the hook-tape 40a and the loop-tape 40b to each respective scrubbing pad. The two scrubbing pads then simply must be pressed together, with the loop 18 sandwiched in between (as best seen in FIG. 2).

Returning to FIGS. 2 and 3, another feature of the netting material 24 and pouch 26 formed thereof, will now be concisely discussed. As shown in FIG. 2, the pouch would be positioned so as to pass out of the center opening 30 of scrubbing pad 14-2—thereby enabling the scrubbing pad 14-1 to be employed for cleaning—with the pouch 26 positioned and arranged for collecting freed debris within a collection interior 32. In contrast, and a clearly shown in FIG. 3, when scrubbing pad 14-2 is required for cleaning activities, the pouch would be 'reversed' and positioned so as to pass out of the center opening 30 of scrubbing pad 14-1. This reversibility of the pouch 26 is important for collecting freed debris, regardless of the scrubbing pad to be used.

Turning now to FIGS. 4A and 4B, several differing sandwich arrangements, and associated scrubbing pads, will be discussed. FIG. 4A provides a cross section view, taken along the line 4A-4A of FIG. 3, which clearly shows the herein discussed sandwich arrangement of scrubbing pads. As can be seen in FIG. 4A, a bonding material 40 may be included to maintain the sandwiching of the loop 18 (not visible) by the scrubbing pads 14-1 and 14-2. Suitable bonding materials 40 may include glue, double sided tape, etc. In addition, as clearly seen in FIG. 4C, hook-tape 40a and loop-tape 40b strips (or portions) may be employed. As such, with the hook-tape 40a fixed to a first inner surface of a scrubbing pad (14-1 as depicted) and the loop-tape 40b fixed to a first inner surface of a scrubbing pad (14-2 as depicted). As appreciated by skilled persons, the use of hook and loop tape would enable, among other things, the scrubbing pads to be replaced/replaceable.

Figure 5A:
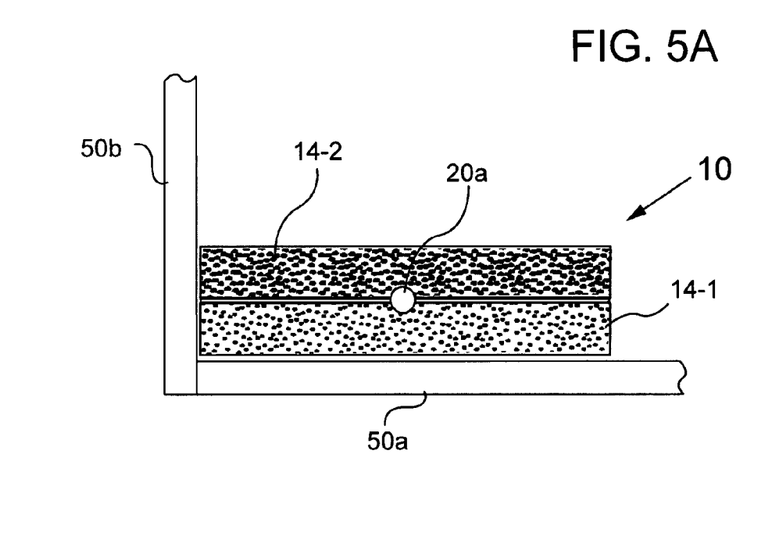
FIGS. 5A, 5B, and 5C illustrate embodiments of a cleaning and collection portion of the invention, depicted during cleaning activities.
Figure 5B:
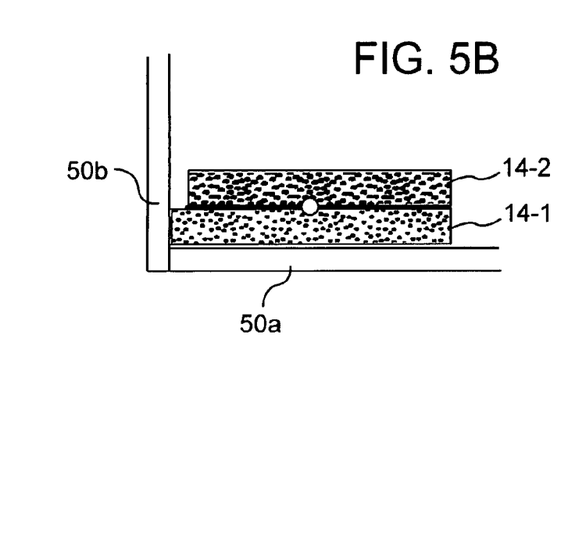
Figure 5C:
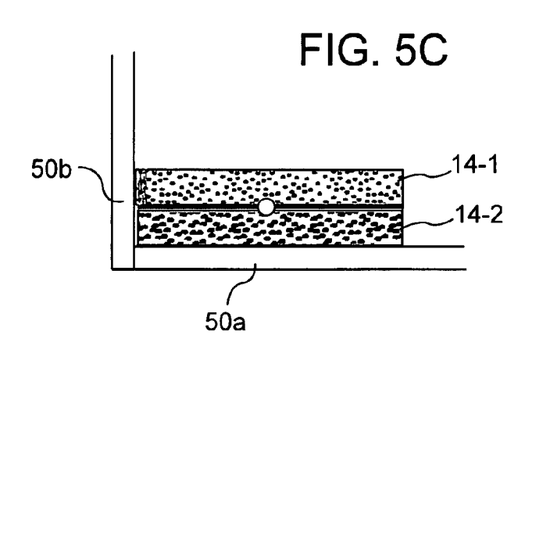
Figure 6:
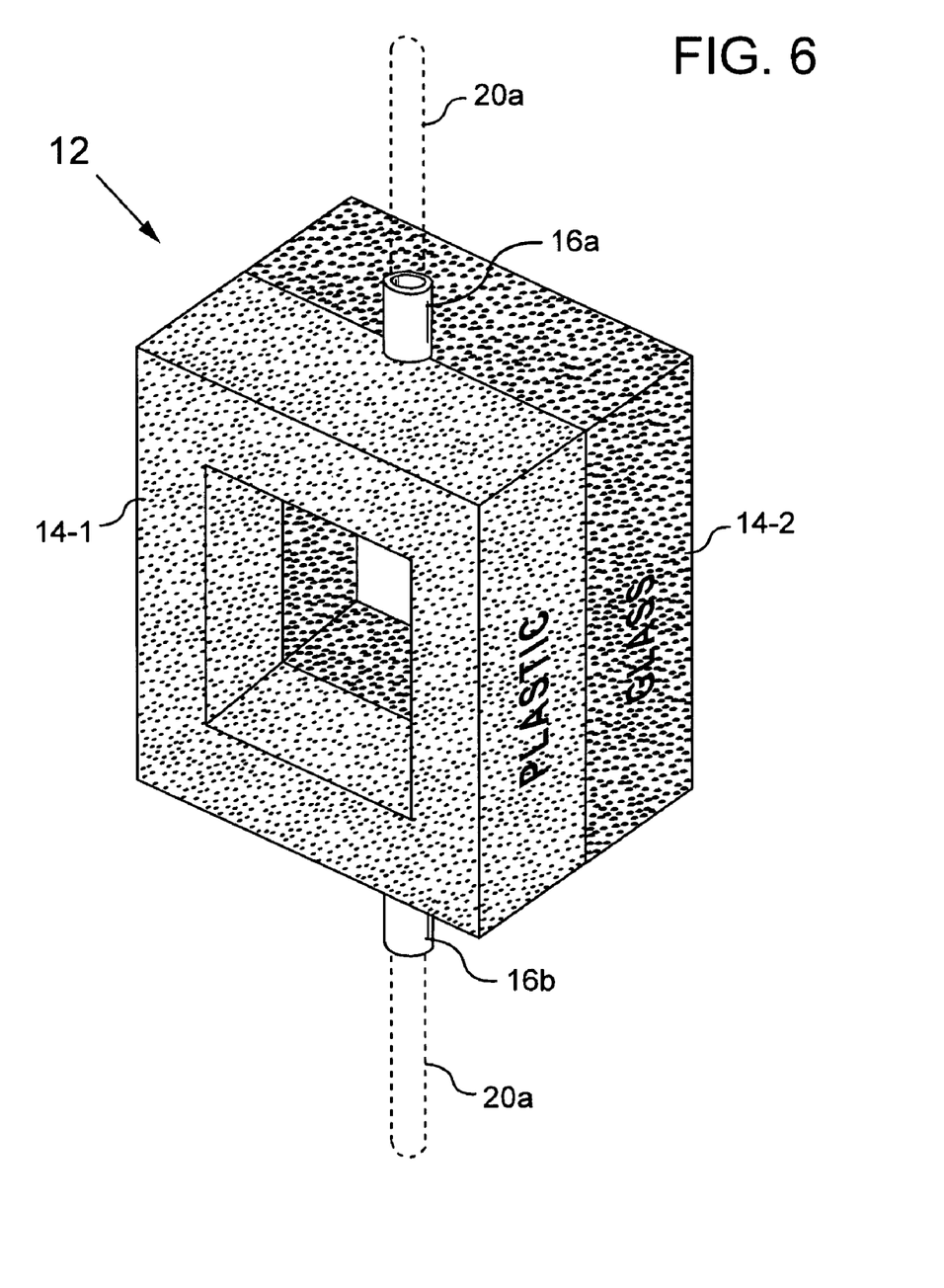
FIG. 6 illustrates an embodiment of the invention having a modified cleaning and collection portion, including at least two handle receptacles for supporting a removable handle and gripping portion that may be placed and secured within either of a top handle receptacle or bottom receptacle.

Returning to FIG. 4A, as depicted, the end extension 14-1a causes the end of scrubbing pad 14-1 to extend beyond the end of scrubbing pad 14-2 by an extension E1. The inclusion of extension 14-1a has a number of possible advantages. One of particular interest is to provide a means to protect softer aquarium wall surfaces when cleaning corner locations of the aquarium. Consider the arrangement of FIG. 5A, wherein a first wall 50a and a second wall 50b, form a corner location. As depicted in FIG. 5A, when the pads end evenly, and are quite rectangular, say with a thickness T1, each scrubbing pad 14-1 and 14-2 may contact the second wall 50b. Accordingly, if a user vigorously scrubs the corner location, then there will be a tendency for both the side portion surfaces of each of the scrubbing pads 14-1 and 14-2 to contact an adjacent wall surface, which may certainly lead to scratching and damage to a portion of the second wall 50b. In contract, and as depicted in FIG. 5B, a softer and or less abrasive scrubbing pad 14-1, having the extension 14-1a, may be used to safely clean soft (plastic) wall surfaces, while the more abrasive scrubbing pad 14-2 is spaced away from contacting the corner side wall. In addition, as depicted in FIG. 5C, if a 'reversibility feature' is provided (FIG. 6), an additional pressure may be applied by a user for causing a compressing of the extension 14-1a of the less abrasive scrubbing pad 14-1. And thereby enabling corners of harder (e.g., glass) aquarium walls to be also fully cleaned.

Turning to FIG. 4B, yet another arrangement may be provided for enabling both softer and harder wall surfaces to be cleaned. As illustrated therein, the softer or less abrasive scrubbing pad 14-1 includes a thickness increasing end extension 14-1*aa*. The thickness increasing extension 14-1*aa*, providing an L-shaped pad, which may be said to have an L-shaped cross-section (as clearly shown in FIG. 4B), provides for scrubbing pad 14-1 that wraps around one side of a second scrubbing pad 14-2. This arrangement would certainly protect plastic and generally softer wall structures from scratching caused by a contacting of wall surfaces by scrubbing pad 14-2.

While there have been described herein a plurality of the currently preferred embodiments of the means and methods of the present invention, those skilled in the art will recognize that other and further modifications may be made without departing from the invention. For example, included scrubbing pads, may be formed of layers of materials, providing additional 'sandwich layers'. As such, the foregoing descriptions of the specific embodiments of the present invention have been provided for the purposes of illustration, description, and enablement. They are not intended to be exhaustive or to limit the invention to the specific forms disclosed and or illustrated. Obviously numerous modifications and alterations are possible in light of the above teachings, and it is fully intended to claim all modifications and variations that fall within the scope of the appended claims provided hereinafter.

What is claimed is:

1. An aquarium cleaning device, comprising:
   a) a substantially rigid closed loop, with the loop having a first side and a second side;
   b) a netting material of a selected area, having pre-defined perimeter portions;
   c) at least one scrubbing pad having a center opening, with each included scrubbing pad securely fixable to one of the first side of the loop or the second side of the loop;
   d) with each included scrubbing pad formed of a debris dislodging abrasive material selected so as to not scratch wall surfaces of an aquarium during cleaning activities;
   e) with the perimeter portions of the netting material secured to at least one of:
      i) the rigid loop; and
      ii) surfaces of at least one included scrubbing pad;
   f) an elongated handle portion fixedly coupled to the loop and arranged for grasping by a user such that the cleaning device can be employed for dislodging and freeing debris from locations of the aquarium and simultaneously collecting dislodged and freed debris upon the netting material for subsequent removal from the aquarium.

2. The aquarium cleaning device in accordance with claim 1, wherein two scrubbing pads are included with one fixedly coupled substantially on the first side of the loop and a second fixedly coupled substantially to the second side.

3. The aquarium cleaning device in accordance with claim 2, wherein the amount of netting material is provided such that a net pouch may be formed of the netting material for aiding in maintaining collected debris within the net pouch.

4. The aquarium cleaning device in accordance with claim 3, wherein the net pouch is configured such that a bottom of the net pouch may be positioned and located, by a user, to be on one of the first side of the loop, and extending through the opening of the scrubbing pad fixed to the first side, or on the second side of the loop, and extending through the opening of the scrubbing pad fixed to the second side.

5. The aquarium cleaning device in accordance with claim 4, wherein the handle and loop are formed of a single piece of substantially rigid material that is at least one of:
   a) bent;
   b) twisted; and
   c) cast.

6. The aquarium cleaning device in accordance with claim 1 wherein:
   a) two scrubbing pads are included with one fixedly coupled substantially on the first side of the loop and a second fixedly coupled substantially to the second side;
   b) wherein the two scrubbing pads are formed of differing materials, with each material having a distinct level of abrasiveness.

7. The aquarium cleaning device in accordance with claim 6 wherein the first and second scrubbing pads sandwich the loop and:
   a) the first scrubbing pad is provided located substantially upon the first side of the loop, and formed by a first abrasive material with a level of abrasiveness intended for use with plastic aquarium surfaces; and
   b) the second scrubbing pad is provided located substantially upon the second side of the loop, and formed by a second abrasive material with a level of abrasiveness intended for use with glass aquarium surfaces.

8. The aquarium cleaning device in accordance with claim 7, wherein the sandwich of the loop between the two scrubbing pads is maintained by the use of at least one of:
   a) glue;
   b) water-proof double sided tape; and
   c) the use of hook and loop tape.

9. The aquarium cleaning device in accordance with claim 8, wherein a shape of the loop and the included scrubbing pads are rectangular.

10. An aquarium cleaning device useful for dislodging and freeing debris from locations of the aquarium, including the inner wall surfaces of the aquarium, and simultaneously collecting dislodged and freed debris for subsequent removal from the aquarium, the cleaning device comprising:
    a) a frame structure including a substantially rigid closed and flattened loop, with the loop having a first side and a second side;
    b) a netting material having perimeter portions;
    c) at least one scrubbing pad having a center opening, with each included scrubbing pad securely fixable to one of the first side of the loop or the second side of the loop;
    d) with the included scrubbing pads provided by a debris dislodging abrasive material that will not scratch the wall surfaces during cleaning activities;
    e) with the perimeter portions of the netting material being fixedly attached to at least one of:
       i) the rigid loop of the frame structure; and
       ii) surfaces of one of the included scrubbing pads;
    f) an elongated handle portion fixedly coupled to the loop of the frame structure and arranged to be graspable by a user such that the cleaning device can be employed for dislodging and freeing debris from locations of the aquarium and simultaneously collecting dislodged and freed debris for subsequent removal from the aquarium.

11. The aquarium cleaning device in accordance with claim 10, wherein two scrubbing pads are included with one fixedly coupled on the first side of the loop and the second fixedly coupled to the second side, thereby establishing a sandwich arrangement wherein the loop is sandwiched between the two scrubbing pads.

12. The aquarium cleaning device in accordance with claim 11, wherein the two scrubbing pads are provided by materials having differing levels of abrasiveness, with the first scrubbing pad provided by a first abrasive material with a level of abrasiveness intended for use with plastic aquarium walls, and the second scrubbing pad provided by a second abrasive material with a level of abrasiveness intended for use with glass aquarium walls.

13. The aquarium cleaning device in accordance with claim 12, wherein the sandwich of the loop between the two scrubbing pads is maintained by one of:
   a) glue;
   b) double sided tape; and
   c) hook and loop tape.

14. The aquarium cleaning device in accordance with claim 13, wherein the shape of the center opening of each included scrubbing pad is rectangular.

15. The aquarium cleaning device in accordance with claim 14, wherein the shape of the loop is rectangular.

16. The aquarium cleaning device in accordance with claim 11, wherein the amount of netting material included yields a net pouch for collecting debris, with the net pouch configurable such that a bottom of the net pouch may be positioned to be located on one of the first side of the loop or the second side of the loop.

17. An aquarium wall cleaning device useful for dislodging and freeing debris from wall locations of the aquarium, while also simultaneously collecting dislodged and freed debris for subsequent removal from the aquarium, the cleaning device comprising:
   a) a frame structure including a substantially rigid closed and flattened loop, having an inner area, and also having a first side of the loop and a second side of the loop;
   b) netting material with sufficient area to cover the inner area of the loop, with perimeter portions of the netting material fixed to the loop for also forming a pouch of netting material;
   c) two scrubbing pads, with each having a center opening;
   d) means to effect and maintain a sandwich with the loop firmly sandwiched with a first scrubbing pad fixedly coupled to the first side of the loop, and a second scrubbing pad fixedly coupled to the second side of the loop, thereby establishing the sandwich;
   e) an elongated handle portion fixed to the loop and arranged for secure grasping by a user such that the cleaning device may be employed for dislodging and freeing debris from wall locations of the aquarium, including corner locations, while also simultaneously collecting dislodged and freed debris for easy removal from the aquarium.

18. The aquarium cleaning device in accordance with claim 17, wherein the two scrubbing pads are provided by materials having differing levels of abrasiveness, with:
   a) the first scrubbing pad provided by a first abrasive material with a level of abrasiveness intended for use with plastic aquarium walls; and
   b) the second scrubbing pad provided by a second abrasive material with a level of abrasiveness intended for use with glass aquarium walls.

19. The aquarium cleaning device in accordance with claim 18, wherein the two scrubbing pads are provided such that:
   a) the first scrubbing pad having an L-shaped cross-section, such that the first scrubbing pad wraps around one side of the second scrubbing pad, thereby providing an improved and more protective corner cleaning structure and
   b) the second scrubbing pad is substantially flat and rectangular.

20. The aquarium cleaning device in accordance with claim 19, wherein the first L-shaped pad is intended for use in cleaning plastic walls.

* * * * *